(12) United States Patent
Redden et al.

(10) Patent No.: US 8,881,829 B2
(45) Date of Patent: Nov. 11, 2014

(54) BACKUP WELLHEAD BLOWOUT PREVENTION SYSTEM AND METHOD

(76) Inventors: David B. Redden, Waverley (CA); Frank McCormack, South East (CA); Larry E. Huskins, Milton (CA)

( * ) Notice: Subject to any disclaimer, the term of this patent is extended or adjusted under 35 U.S.C. 154(b) by 0 days.

(21) Appl. No.: 13/253,605

(22) Filed: Oct. 5, 2011

(65) Prior Publication Data

US 2012/0085543 A1    Apr. 12, 2012

Related U.S. Application Data

(60) Provisional application No. 61/390,745, filed on Oct. 7, 2010.

(51) Int. Cl.
*E21B 7/12* (2006.01)
*E21B 33/064* (2006.01)

(52) U.S. Cl.
CPC ..................... *E21B 33/064* (2013.01)
USPC ............ 166/363; 166/338; 166/364; 166/368

(58) Field of Classification Search
CPC ........ E21B 33/06; E21B 33/03; E21B 33/038
USPC ................. 166/363, 364, 368, 338, 341, 343
See application file for complete search history.

(56) References Cited

U.S. PATENT DOCUMENTS

| | | | | |
|---|---|---|---|---|
| 2,904,357 A | * | 9/1959 | Knox | 277/328 |
| 3,052,301 A | * | 9/1962 | Watts et al. | 166/89.2 |
| 3,096,999 A | * | 7/1963 | Ahlstone et al. | 166/340 |
| 3,298,699 A | * | 1/1967 | Hall, Sr. | 277/327 |
| 3,324,943 A | | 6/1967 | Price | |
| 3,608,932 A | * | 9/1971 | Brown | 285/18 |
| 4,478,287 A | * | 10/1984 | Hynes et al. | 166/341 |
| 4,531,580 A | * | 7/1985 | Jones | 166/84.3 |
| 4,626,135 A | * | 12/1986 | Roche | 405/224.2 |
| 4,685,521 A | | 8/1987 | Raulins | |
| 4,718,495 A | * | 1/1988 | Lubitz et al. | 166/387 |
| 5,195,361 A | * | 3/1993 | Wood et al. | 73/49.8 |
| 5,425,420 A | * | 6/1995 | Pringle | 166/242.2 |
| 5,492,373 A | * | 2/1996 | Smith | 285/148.19 |
| 5,617,917 A | * | 4/1997 | Squires | 166/85.4 |
| 5,988,274 A | | 11/1999 | Funk | |

(Continued)

FOREIGN PATENT DOCUMENTS

| | | |
|---|---|---|
| GB | 2402409 | 12/2004 |
| WO | WO 2005/042917 | 5/2005 |
| WO | WO 2009/039349 | 3/2009 |

*Primary Examiner* — Matthew Buck
*Assistant Examiner* — Aaron Lembo
(74) *Attorney, Agent, or Firm* — Dean A. Craine

(57) ABSTRACT

A backup blowout system for a subsea wellhead positioned between an existing blowout prevention system and the wellhead. The backup blowout system includes an independently operated shear/blind ram assembly that attaches to a standard wellhead connector that connects to the wellhead. The ram assembly includes an upper neck with an upper flange on which a dual housing assembly is attached. The dual housing assembly includes a primary housing longitudinally aligned over a secondary housing. The primary and secondary housings include lower bodies and upper necks that have identical diameters. During assembly, the existing primary blowout prevention system is initially connected to the primary housing and the ram assembly is connected to the wellhead connector. When a blowout occurs, the primary housing is disconnected from the secondary housing to expose the upper neck of the secondary housing upon which a replacement primary blowout prevention system or cap may be attached.

3 Claims, 4 Drawing Sheets

(56) References Cited

U.S. PATENT DOCUMENTS

| | | | |
|---|---|---|---|
| 6,024,172 A * | 2/2000 | Lee | 166/363 |
| 6,408,947 B1 * | 6/2002 | Cunningham et al. | 166/339 |
| 6,715,554 B1 * | 4/2004 | Cunningham et al. | 166/348 |
| 6,772,843 B2 * | 8/2004 | Nice et al. | 166/368 |
| 6,817,421 B2 * | 11/2004 | Dallas | 166/379 |
| 6,969,042 B2 * | 11/2005 | Gaydos | 251/1.3 |
| 7,000,888 B2 * | 2/2006 | Wright et al. | 251/1.3 |
| 7,240,736 B2 * | 7/2007 | Fenton et al. | 166/358 |
| 7,374,146 B2 * | 5/2008 | Whitby et al. | 251/1.3 |
| 7,552,765 B2 * | 6/2009 | Lam | 166/85.4 |
| 7,849,926 B2 * | 12/2010 | Inderberg | 166/363 |
| 7,921,917 B2 * | 4/2011 | Kotrla et al. | 166/339 |
| 2006/0124314 A1 * | 6/2006 | Haheim et al. | 166/368 |
| 2006/0191716 A1 * | 8/2006 | Humphreys | 175/5 |
| 2006/0201682 A1 * | 9/2006 | Reynolds | 166/368 |
| 2006/0201683 A1 * | 9/2006 | Reynolds | 166/368 |
| 2008/0105435 A1 * | 5/2008 | Inderberg | 166/363 |
| 2008/0164431 A1 * | 7/2008 | Whitby et al. | 251/1.1 |
| 2009/0260830 A1 * | 10/2009 | Hansen | 166/339 |
| 2010/0300700 A1 * | 12/2010 | Garbett et al. | 166/368 |
| 2011/0297394 A1 * | 12/2011 | VanDelden | 166/373 |

* cited by examiner

BACKUP WELLHEAD BLOWOUT PREVENTION SYSTEM AND METHOD

This utility patent application is based on and claims the priority filing date benefit of U.S. Provisional patent application (Application No. 61/390,745), filed on Oct. 7, 2010.

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to blowout prevention systems for subsea wellheads, and more particularly to blowout prevention systems that serve as a backup or fail safe system to existing primary blowout prevention systems.

2. Description of the Related Art

For subsea drilling operations, if the pressure of the formation fluids exceeds the hydrostatic of the fluid in the well bore and the associated surface pressure applied, a blowout emergency may develop. Heretofore, the blowout emergency is managed by the operational personnel on the offshore drilling unit using a subsea blowout prevention system (hereinafter referred to as 'BOP system') that is attached to the wellhead on the seafloor.

Federal regulations require that all offshore drilling operations use a 'BOP system' that include different types of ram assemblies, annular seals, remote operated valves, a marine riser, a diverter, tensioners, and a redundant control system managed from the drilling unit located on the surface of the water.

A typical 'BOP system' connects to the top of the wellhead housing a cylindrical wellhead connector. The wellhead housing is found near the seabed and remains in place after the drilling unit has completed its operation and has been removed. The wellhead housing is designed to withstand all the stresses generated by the 'BOP system' and the marine riser running back to the drilling rig.

SUMMARY OF THE INVENTION

An important aspect of the following invention is the discovery that existing wellheads with 'BOP systems' can fail and that a backup blowout preventing systems that operates independent from the offshore drilling operation or the primary 'BOP system' is needed.

Disclosed herein is a fail-safe, independently controlled and operated backup blowout prevention system for a subsea wellhead that also uses a primary BOP system. The backup blowout prevention system which is positioned between the primary BOP system and the wellhead, allows the fluid flowing from the well to be shut off prior to reaching the primary BOP system so that the primary BOP system may be repaired or replaced. In some instances, the backup prevention system may be capped altogether.

The backup blowout prevention system includes an independently operated shear/blind ram assembly designed to attach to a standard wellhead connector. The ram assembly includes a horizontally aligned main body with two opposing hydraulic ram units located at its opposite ends which when activated are designed to shut off the flow of fluid through the transversely aligned bore extending vertically through the main body. Perpendicularly aligned and mounted on opposite sides of the main body and aligned with the bore inside the main body is an upper neck and a lower neck. Formed on the upper and lower necks are perpendicularly aligned connection flanges. The connection flange on the lower neck is attached to the connection flange on the wellhead connector and the connection flange on the upper neck is attached to the a dual housing assembly.

The dual housing assembly includes an upper primary housing longitudinally aligned and stacked over a lower secondary housing. The primary and secondary housings each include a wide, cylindrical lower body and narrow, cylindrical upper neck that have the same diameters as a standard internal bore. Formed on the primary housing is a perpendicularly aligned flange surface that rests on a perpendicularly aligned upper flange on the secondary housing. The secondary housing also includes a lower flange that connects to the upper flange on the upper neck on the ram assembly. Each housing includes a longitudinally aligned center internal bore that runs throughout the system.

The adjacent flanges on the ram assembly and the dual housing assembly are connected together with suitable threaded bolts. When the primary housing or the primary BOP system is damaged, the ram assembly can be remotely activated to close the well. The primary housing may be disconnected from the secondary housing thereby exposing the profile on the neck on the secondary housing. A replacement BOP system may be attached to the secondary housing. In some instances, a cap may be attached to the secondary housing to stop the blowout.

The primary BOP is under the control of personnel located on the drilling unit while the operation of the ram assembly and cutting of the threaded bolts used to hold the primary and second housing together are controlled remotely or operated by an independent remote operated vehicle (ROV) vehicle. In the preferred embodiment, the control system is located on the system to ensure a quick and independent response in emergency situations. Remote controls for this system can be provided using multiple alternative options such as acoustics or ROV interface.

DESCRIPTION OF THE PREFERRED EMBODIMENT(S)

Figure 1:
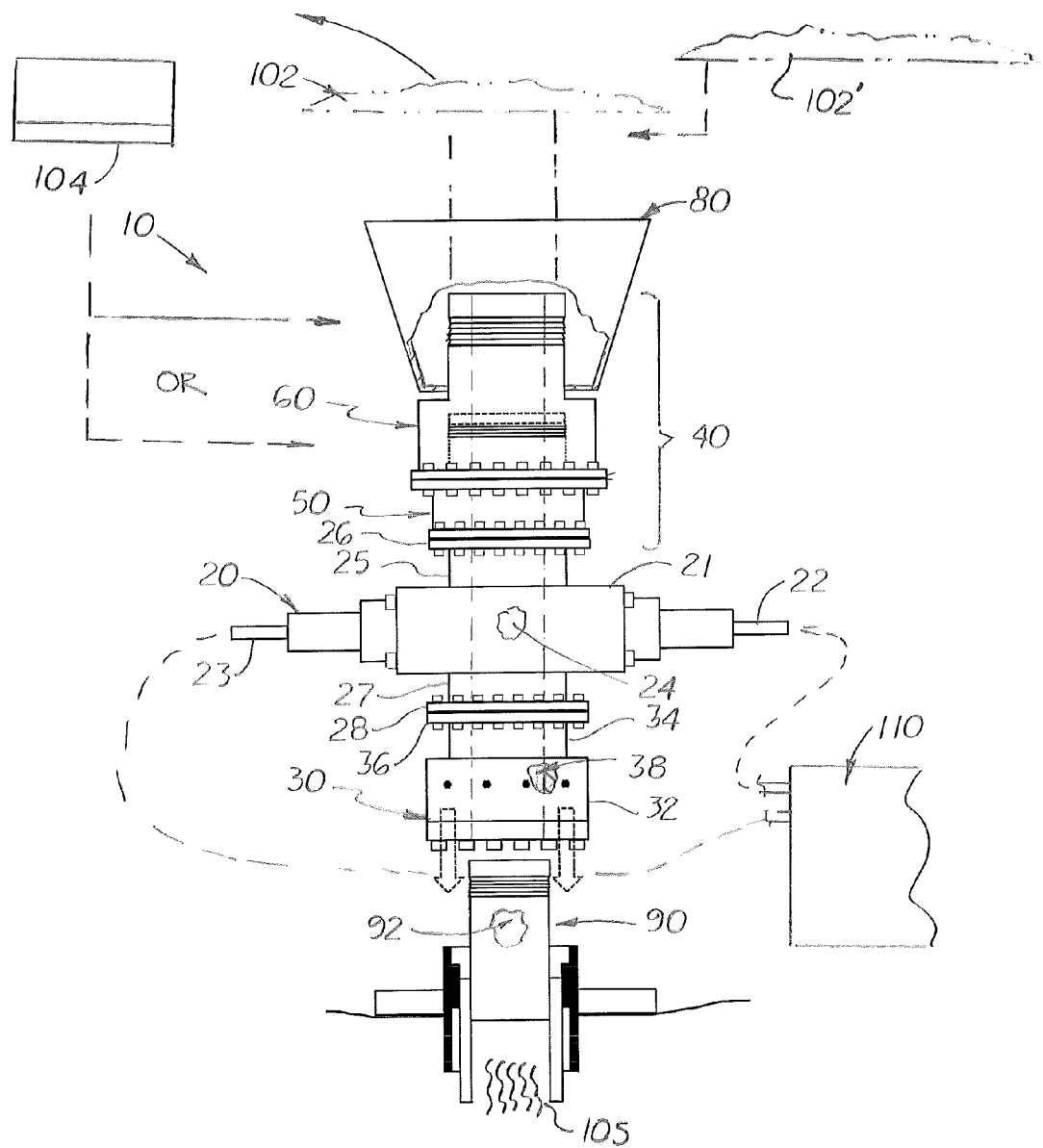
FIG. 1 is an illustration of the system.

Referring to the FIG. 1, there is shown a subsea backup blowout prevention system 10 designed to be placed between the wellhead 90 and the primary BOP 102. When damage occurs to the primary BOP 102 or to the primary housing 60 used to connect the primary BOP 102 to the wellhead 90, the flow of fluids 105 from the wellhead 90 may be stopped and a partially concealed secondary housing 50 may be exposed and connected to a replacement primary BOP 102'.

The system 10 includes a blind/shear ram assembly 20 mounted on a wellhead connector 30 designed to connect to a wellhead 90. The wellhead connector 30 includes a main body 32 with a longitudinally aligned neck 34 attached or formed thereon. Attached or formed on the top edge of the neck 34 is a connection flange 36. Formed inside the main body 32 and in the neck 34 is a continuous internal bore 38 that communicates with the well bore 92 in the wellhead 90.

The ram assembly 20 is designed to selectively shear or close off the wellbore 92. The ram assembly 20 is an independently operated shear/blind ram assembly designed to attach to the wellhead connector 30. The ram assembly 20 includes a horizontally aligned main body 21 with two opposing hydraulic ram units 22, 23 located at its opposite ends which when activated are designed to shut off the flow of fluids 92 through the transversely aligned bore 24 extending through the main body 21. Perpendicularly aligned and mounted on opposite sides of the main body 21 and aligned with the bore 24 is an upper neck 25 and a lower neck 27. Formed on the upper and lower necks 25, 27 are perpendicularly aligned connection flanges 26, 28, respectively. During assembly, the connection flange 28 on the lower neck 27 is attached to the connection flange 36 on the wellhead connector 30 and the connection flange 26 on the upper neck 25 is attached to the dual housing assembly 40.

Figure 2:
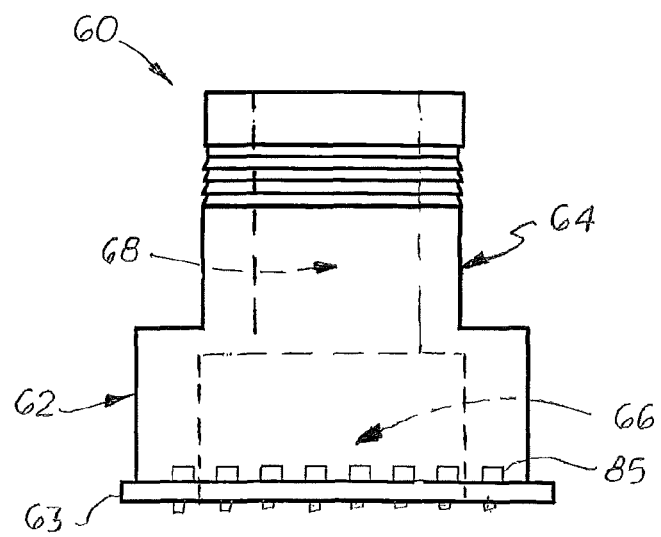
FIG. 2 is a sectional side elevation view of the primary housing.
Figure 3:
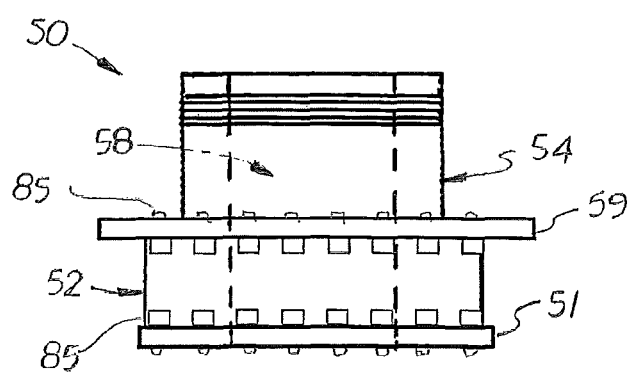
FIG. 3 is a sectional side elevation view of the secondary housing
Figure 4:
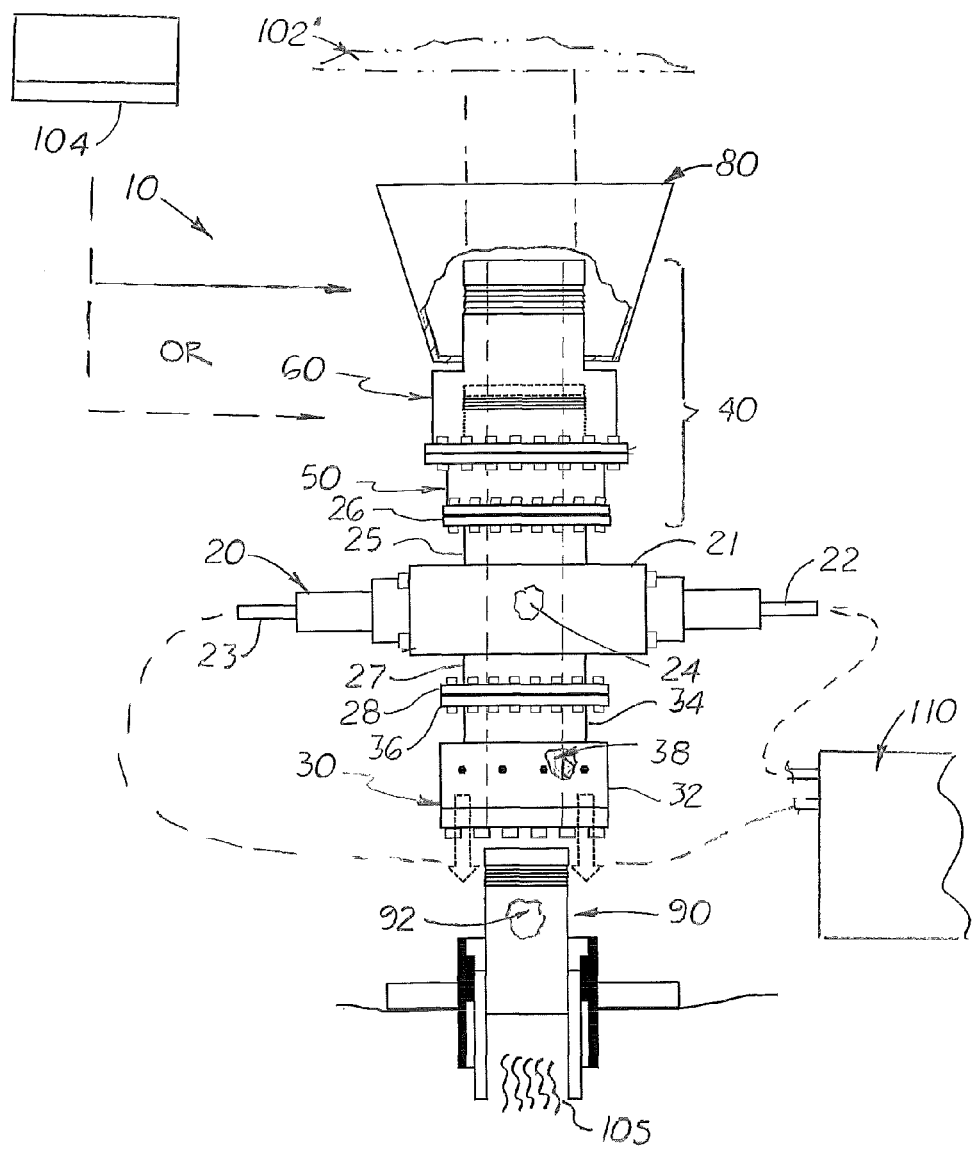
FIG. 4 is an illustration of the subsea backup blowout prevention system showing the replacement blowout prevention system in an installed position.
Figure 5:
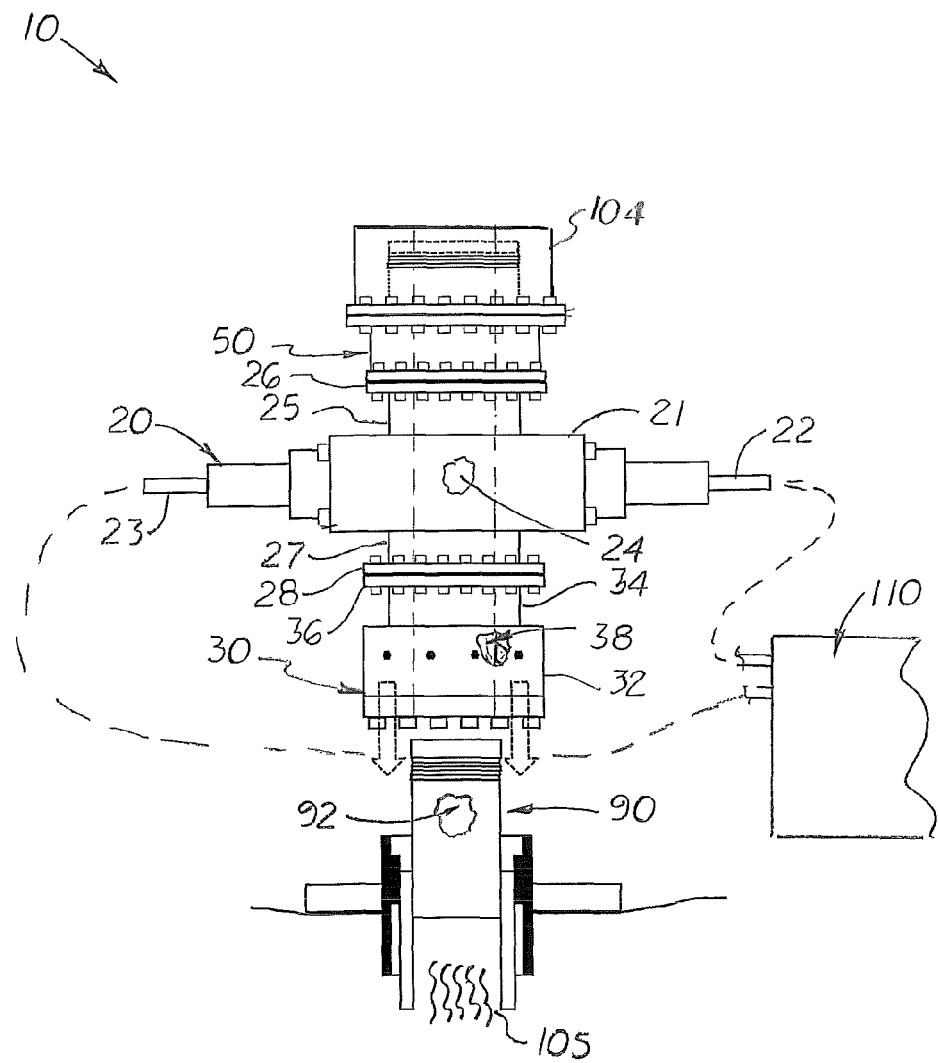
FIG. 5 is an illustration of the subsea backup blowout prevention system showing a capping system in an installed position.

The dual housing assembly 40 is disposed between the ram assembly 20 and the primary BOP system 102. The dual housing assembly 40 includes an upper primary housing 60 longitudinally aligned and stacked over a lower secondary housing 50. As shown more clearly in FIGS. 2 and 3, the secondary and primary housings 50, 60 are inverted T-shaped structures. Each housing 50, 60 includes a wide, cylindrical lower body 52, 62, and a narrow, cylindrical upper neck 54, 64, respectively, that have the same diameters as the wellhead 90. Formed inside the lower body 62 of the primary housing 60 is a recessed cavity 66 that is sufficient in depth and diameter to receive the neck 54 on the secondary housing 50. Formed inside the upper neck 64 and communicating with the recessed cavity 66 is a longitudinally aligned bore 68. A longitudinally aligned bore 58 is formed inside the secondary housing 50 and extends continuously through the main body 52 and the upper neck 54.

Formed on the lower edge of the lower body 62 is a flange surface 63. Formed on the lower edge of the wide body 52 of the secondary housing 50 is a lower flange surface 51 that connects to the upper flange 26 on the upper neck 25 on the ram assembly 20. The secondary housing 50 also includes an upper flange surface 59 located along the top edge of the wide body 52 that is placed under and adjacent to the flange surface 63 on the main body 62 on the primary housing 60 during assembly. Suitable threaded bolts 85 are used to attach the lower flange surface 51 on the secondary housing 50 to the upper connection flange 26 on the ram assembly 20 and suitable threaded bolts 85' are used to attach the upper flange surface 59 to the lower flange surface 63.

As shown in FIG. 1, an optional guide funnel 80 may be longitudinally aligned and extended around the upper neck 64 on the primary housing 60 to facilitate attachment of the BOP 102 to the primary housing 60.

If an emergency condition occurs that results in damage to the primary BOP 102, the ram assembly 20 may be activated to shear or close off the wellbore 92. The threaded bolts 85' used to connect the primary housing 60 to the secondary housing 50 are then cut or sheared with suitable cutting tools (not shown) so that the primary housing 60 and the primary BOP system 102 attached thereto may be removed. When the primary housing 60 is removed, the lower body 62 on primary housing 60 also removed thereby exposing the neck 54 on the secondary housing 50. A replacement primary BOP system 102' or capping system 104 may then be positioned over and attached to the neck 54 on the secondary housing 50.

The entire system 10 would be coupled to a control system that receives signals from a remote station 110 to selectively activate the ram assembly 20. The system 10 may also include a remote operated vehicle intervention system that uses a hydraulic pump sub and hot stab and manual high-torque threaded connectors to close the ram assembly 20.

Using the above described system 10, a method of replacing a blowout preventing system or capping a subsea drilling operation is provided that includes the following steps:

a. creating a subsea wellhead;
    b. selecting a backup blowout assembly that includes;
    a wellhead connector configured to be attached to a wellhead, a shear/blind ram assembly, a dual housing assembly that includes an upper primary housing with an exposed upper neck a lower secondary housing with a upper neck covered by said primary housing, and a plurality of connectors used to selectively connect said wellhead connector to said wellhead, to selectively connect said ram assembly to said wellhead connector, to selectively connect said secondary housing to said ram assembly, and to selectively connect said primary housing to said secondary housing;
    c. connecting said wellhead connector to said wellhead;
    d. connecting said ram assembly to said wellhead connector;
    e. connecting said dual housing assembly to said ram assembly;
    f. attaching a primary blowout prevention assembly to said primary housing on said dual housing assembly;
    g. disconnecting said primary housing from said secondary housing thereby exposing the upper neck of said secondary housing; and,
    h. connecting a replacement blowout prevention system or cap to said upper neck on said secondary housing.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. A system for allowing the replacement of a blowout preventing system or capping a subsea wellhead which are used with a subsea drilling operation that includes a wellhead with a primary blowout preventing system positioned above or attached to the wellhead, the system comprising:

a. a wellhead connector configured to be attached to said wellhead, said wellhead connector includes an upper connection flange;
    b. a shear/blind ram assembly that includes a main body, a perpendicularly aligned lower neck and a perpendicularly aligned upper neck, said main body includes a fluid bore and two opposite ram units on opposite sides of said fluid bore that when activated discontinues the flow of a fluid through said fluid bore, said lower neck includes a perpendicularly aligned lower connection flange and said upper neck includes a perpendicularly aligned upper connection flange, said shear/blind ram assembly being aligned over said wellhead connector so said lower connection flange on said lower neck is placed over and adjacent to said upper connection flange on said wellhead connector;

c. a dual housing assembly that includes an upper primary housing longitudinally aligned and stacked over a lower secondary housing, said primary housing includes a wide cylindrical first lower body, a narrow cylindrical first upper neck and a longitudinally aligned bore, said first lower body on said primary housing includes a recessed cavity, said first upper neck extends upward and configured to connect to said primary blowout preventing system located above said dual housing assembly, said secondary housing includes a wide cylindrical second lower body and a narrow-cylindrical second upper neck and a longitudinally aligned bore, said second upper neck on said secondary housing configured to extend into said recessed cavity on said first lower body of said primary housing when said primary housing is longitudinally aligned over said secondary housing, said second upper neck on said secondary housing being the same diameter as said first upper neck on said primary housing and configured to connect to said primary blowout preventing system when exposed after removing said primary housing from said secondary housing, said first lower body on said primary housing includes a lower flange surface and said secondary housing includes an upper flange surface and a lower flange surface, said upper flange surface on said secondary housing is configured to be aligned with said lower flange surface on said primary housing when said second upper neck on said secondary housing is inserted into said recessed cavity located in said first lower body of said primary housing, said lower flange surface on said secondary housing is configured to be aligned with said upper connection flange on said upper neck on said shear/blind ram assembly;

d. a first set of connectors used to selectively attach said lower connection flange on said ram assembly to said upper connection flange on said wellhead connector;

e. a second set of connectors used to selectively attach said lower flange surface on said secondary housing to said upper connection flange on said shear/blind ram assembly; and, f. a third set of connectors used to selectively attach said lower flange surface on said primary housing to said upper flange surface on said secondary housing.

2. The system, as recited in claim 1, further including a guide funnel longitudinally aligned and extended over said upper neck on said primary housing.

3. A method of replacing a blowout preventing system or capping on a subsea wellhead, comprising the following steps:

a. selecting a backup blowout system that includes;
a wellhead connector configured to be attached to said wellhead, a shear/blind ram assembly, and a dual housing assembly that includes an upper primary housing and a lower secondary housing, said primary housing includes a cylindrical first lower body with a flange surface and a recess cavity formed therein, a narrow upward first neck that selectively connects to said primary blowout prevention system located above said dual housing, and a longitudinally aligned bore that extends through said first lower body and said first upper neck, said secondary housing includes a cylindrical second lower body, a second upper neck, and a longitudinally aligned bore, said second lower body on said secondary housing includes an upper flange surface and a lower flange surface, said second upper neck on said secondary housing configured to extend into said recessed cavity on said first lower body of said primary housing, said second upper neck on said secondary housing being the same diameter as said first upper neck on said primary housing and configured to connect to said primary blowout preventing system located above said shear/blind ram assembly after removing said primary housing from said secondary housing;

said backup blowout system also includes a plurality of connectors used to selectively connect said wellhead connector to said wellhead, a plurality of connectors to selectively connect said shear/blind ram assembly to said wellhead connector, a plurality of connectors to selectively connect said lower flange surface on said secondary housing to said shear/blind ram assembly, and a plurality of connectors to selectively connect said flange surface on said primary housing to said upper flange surface on said secondary housing;

b. connecting said wellhead connector to said wellhead;

c. connecting said shear/blind ram assembly to said wellhead connector;

d. connecting said lower flange surface on said secondary housing on said dual housing assembly to said shear/blind ram assembly;

e. attaching said primary blowout preventing system to said primary housing on said dual housing assembly;

f. disconnecting said lower flange surface on said primary housing from said upper flange surface on said secondary housing and removing said primary housing thereby exposing said second upper neck of said secondary housing; and, g. connecting said primary blowout preventing system or a replacement blowout preventing system or a cap to said second upper neck on said secondary housing.

* * * * *